(12) United States Patent
Raines et al.

(10) Patent No.: US 9,202,210 B2
(45) Date of Patent: Dec. 1, 2015

(54) DIGITAL RIGHTS MANAGEMENT DEVICE AND METHOD

(75) Inventors: Moshe Raines, Tel Aviv (IL); Tavi Salomon, Holon (IL); Itzhak Pomerantz, Kefar Saba (IL)

(73) Assignee: SanDisk IL LTD., Kfar Saba (IL)

( * ) Notice: Subject to any disclaimer, the term of this patent is extended or adjusted under 35 U.S.C. 154(b) by 1504 days.

(21) Appl. No.: 11/562,430

(22) Filed: Nov. 22, 2006

(65) Prior Publication Data

US 2007/0174919 A1 Jul. 26, 2007

Related U.S. Application Data

(60) Provisional application No. 60/597,320, filed on Nov. 23, 2005, provisional application No. 60/747,194, filed on May 14, 2006.

(51) Int. Cl.

| | |
|---|---|
| *G06Q 30/06* | (2012.01) |
| *G06Q 30/00* | (2012.01) |
| *G06Q 20/12* | (2012.01) |
| *G06F 21/10* | (2013.01) |
| *H04H 60/23* | (2008.01) |
| *H04N 5/765* | (2006.01) |

(Continued)

(52) U.S. Cl.
CPC ............ *G06Q 20/1235* (2013.01); *G06F 21/10* (2013.01); *G06Q 30/06* (2013.01); *H04H 60/23* (2013.01); *H04N 5/765* (2013.01); *H04N 5/913* (2013.01); *H04N 21/2541* (2013.01); *H04N 21/4104* (2013.01); *H04N 21/4126* (2013.01); *H04N 21/4183* (2013.01); *H04N 21/4184* (2013.01); *H04N 21/41407* (2013.01); *H04N 21/4367* (2013.01); *H04N 21/4405* (2013.01); *H04N 21/4408* (2013.01); *H04N 21/4623* (2013.01); *H04N 21/4627* (2013.01); *H04N 21/63775* (2013.01); *H04N 21/835* (2013.01); *H04N 21/8355* (2013.01); *H04N 5/775* (2013.01)

(58) Field of Classification Search
CPC .................................................. G06Q 20/1235
USPC ................................................ 472/60; 700/94
See application file for complete search history.

(56) References Cited

U.S. PATENT DOCUMENTS 5,530,235 A * 6/1996 Stefik et al. ................... 235/492
5,892,900 A    4/1999 Ginter et al.

(Continued)

FOREIGN PATENT DOCUMENTS

WO        2005/069614 A1     7/2005

OTHER PUBLICATIONS

International Search Report issued in inernational application No. PCT/IL2006/001355, mailed on Feb. 20, 2009 (1 page).

(Continued)

*Primary Examiner* — Calvin L Hewitt, II
*Assistant Examiner* — Cristina Sherr
(74) *Attorney, Agent, or Firm* — Brinks Gilson & Lione

(57) ABSTRACT

A portable storage device includes a mechanism for receiving a value of an identification parameter from a receiving device, a non-volatile memory for storing digital content, a licensing policy, and a license for viewing the digital content on the receiving device as identified by the identification parameter, and a controller that is operative, in response to the identification parameter and the license, to provide a controlled feeding of at least a portion of the digital content to the receiving device, in accordance with the licensing policy.

26 Claims, 6 Drawing Sheets

(51) Int. Cl.

| | | |
|---|---|---|
| *H04N 5/913* | (2006.01) | |
| *H04N 21/254* | (2011.01) | |
| *H04N 21/41* | (2011.01) | |
| *H04N 21/414* | (2011.01) | |
| *H04N 21/418* | (2011.01) | |
| *H04N 21/4367* | (2011.01) | |
| *H04N 21/4405* | (2011.01) | |
| *H04N 21/4408* | (2011.01) | |
| *H04N 21/4623* | (2011.01) | |
| *H04N 21/4627* | (2011.01) | |
| *H04N 21/6377* | (2011.01) | |
| *H04N 21/835* | (2011.01) | |
| *H04N 21/8355* | (2011.01) | |
| *H04N 5/775* | (2006.01) | |

(56) References Cited

U.S. PATENT DOCUMENTS

| | | | |
|---|---|---|---|
| 6,367,019 B1 | 4/2002 | Ansell et al. | |
| 6,611,537 B1 * | 8/2003 | Edens et al. | 370/503 |
| 6,697,944 B1 | 2/2004 | Jones et al. | |
| 6,751,598 B1 | 6/2004 | Yagawa et al. | |
| 7,116,894 B1 * | 10/2006 | Chatterton | 386/211 |
| 7,142,934 B2 * | 11/2006 | Janik | 700/94 |
| 7,552,341 B2 * | 6/2009 | Chen et al. | 713/187 |
| 7,565,680 B1 * | 7/2009 | Asmussen | 725/135 |
| 7,668,312 B2 * | 2/2010 | Lecomte et al. | 380/210 |
| 2002/0154157 A1 * | 10/2002 | Sherr et al. | 345/716 |
| 2003/0037335 A1 * | 2/2003 | Gatto et al. | 725/86 |
| 2004/0030929 A1 | 2/2004 | Bi et al. | |
| 2004/0039916 A1 * | 2/2004 | Aldis et al. | 713/177 |
| 2004/0093509 A1 | 5/2004 | Elazar et al. | |
| 2004/0117840 A1 * | 6/2004 | Boudreau et al. | 725/98 |
| 2004/0148408 A1 * | 7/2004 | Nadarajah | 709/229 |
| 2005/0066353 A1 * | 3/2005 | Fransdonk | 725/29 |
| 2005/0078944 A1 * | 4/2005 | Risan et al. | 386/94 |
| 2005/0138357 A1 * | 6/2005 | Swenson et al. | 713/155 |
| 2005/0216739 A1 * | 9/2005 | Lee et al. | 713/168 |
| 2005/0227773 A1 * | 10/2005 | Lu et al. | 472/60 |
| 2005/0235364 A1 | 10/2005 | Wilson | |
| 2007/0244986 A1 * | 10/2007 | Svendsen | 709/217 |

OTHER PUBLICATIONS

Extended European search report issued in European patent application No. 06821575.5, mailed on Dec. 10, 2009 (7 pages).

* cited by examiner

Appendix A

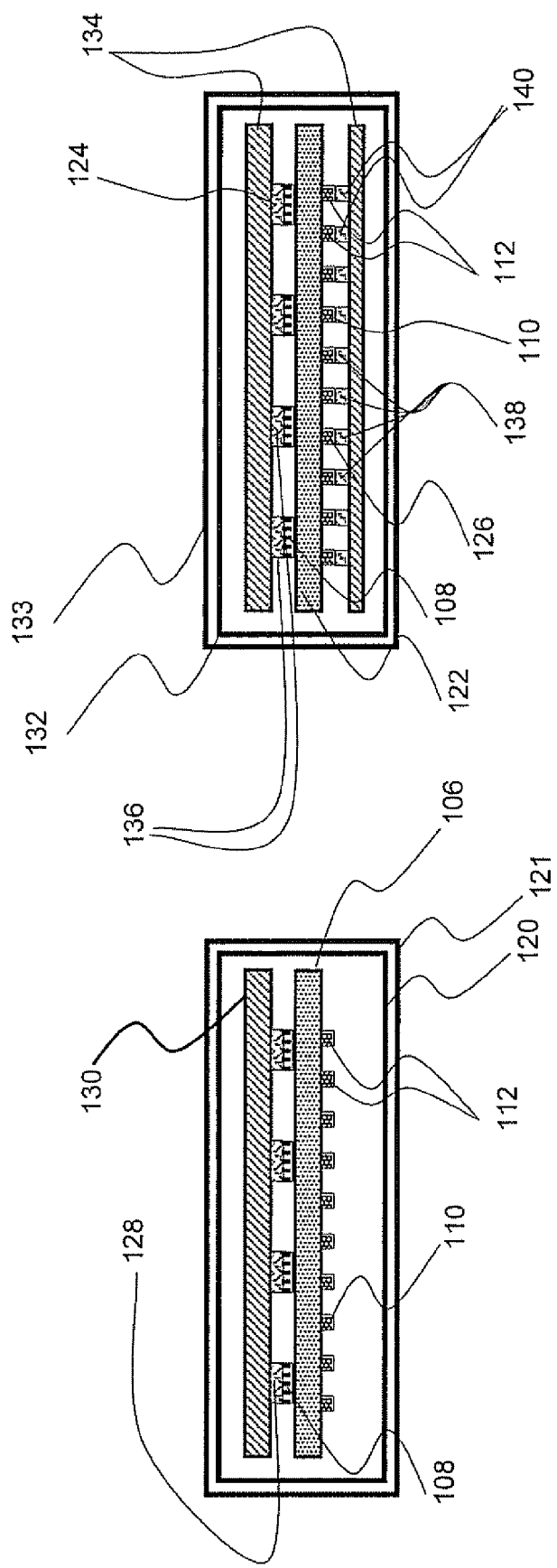

Appendix A

Appendix A

DIGITAL RIGHTS MANAGEMENT DEVICE AND METHOD

CROSS-REFERENCE TO RELATED APPLICATIONS

This patent application claims the benefit of U.S. Provisional Patent Application No. 60/597,320, filed Nov. 23, 2005 and U.S. Provisional Patent Application No. 60/747,194, filed May 14, 2006.

FIELD OF THE INVENTION

The present invention relates to storage devices storing digital content, such as video movies. More particularly, the present invention relates to storage devices providing digital rights of the stored content.

BACKGROUND OF THE INVENTION

The need to transfer digital audio-visual media, such as a video movie, between devices is well known in the art of computer engineering and entertainment product design.

Portable nonvolatile memory devices, such as USB flash drives (UFDs), which are NAND-type flash memory data storage devices integrated with a USB interface, are very well known in the art of computer engineering as means for manually transferring data between devices.

However, storage of a typical video movie, in reasonable quality, requires expensive storage space. In addition, an owner of a movie is not eager to enable an end user to freely duplicate and display the movie on portable devices. Hence, due to the amount of data involved and the limitations imposed by copyright of users, USB devices known in the art are rarely used today for transferring video movies.

An existing approach for transferring video movies is the DRM (Digital Rights Management) technology, such as the OMA DRM™ and the Windows Media DRM™ (WMDRM), which is a technology used to enable the distribution and consumption of digital content in a controlled manner, thereby protecting the interests of owners (such as copyright owners) of content and services from copyright infringement. Typically, authorized recipients or users must acquire a license in order to consume the protected material (e.g. files, music, movies) according to the rights or business rules set by the content owner.

The OMA DRM technology provides digital rights management of contents stored in a secured removable media, such as a SIM (Subscriber Identity Module) and a Secured Memory Card. OMA (Open Mobile Alliance™) is a consortium of the Mobile industry, representing more than 300 worldwide mobile operators, device and network suppliers, information technology companies, and content providers, established to facilitate global user adoption of mobile data services.

The Windows Media DRM™ (WMDRM), available from Microsoft®, is a core technology providing a platform for defining, incorporating, and enforcing digital rights for digital media stored in an encrypted manner within portable devices, network device and removable storage.

Prior art devices utilizing the DRM technology provide a controlled distribution and consumption of protected digital content by storing an encrypted version of the digital content and transmitting the protected content in an encrypted manner to be decrypted by the receiving device upon reception.

The digital content is encrypted by the publisher (or a retailer having digital rights from the publisher) in a way that makes the digital content unusable to an end user of a receiving device that is not equipped with a corresponding decryption key. Such configuration requires configuring the receiving device with a more expensive enhanced computing logic (implemented with a deciphering key for example) to enable decryption of the encrypted streaming content.

Thus, it would be desirable to provide a DRM device with which digital content, such as video or music, can be distributed to a receiving device with copyright protection, while not requiring additional computing logic and security capabilities from the receiving device.

SUMMARY OF THE INVENTION

Accordingly, it is a principal object of the present invention to introduce a portable data storage device providing copyright protection of digital content (e.g. video content, files, music, etc.) by controllably streaming the digital content from the portable storage device to a receiving device.

Typically, the receiving device is a viewing device (such as a digital TV).

In accordance with the present invention, the streaming of content from the portable storage device is contingent on the availability of a license that is obtained for displaying the digital content on a particular viewing device. A license is defined herein as a trusted data object relating to a specific receiving device and to specific digital content.

In accordance with the present invention, there is provided a portable storage device for providing a controlled feeding of streaming digital content, the portable storage device includes: (a) a mechanism for receiving a value of an identification parameter from a receiving device; (b) a non-volatile memory for storing digital content, a licensing policy, and a license for viewing the digital content on the receiving device as identified by the identification parameter; and (c) a controller that is operative, in response to the identification parameter and contingent on a presence of the license, to provide a controlled feeding of at least a portion of the digital content to the receiving device, in accordance with the licensing policy.

Preferably, the controller is operative to provide the controlled feeding of the digital content as plain streaming content (i.e. either streaming content that has never been encrypted or encrypted digital content that has already been decrypted by the portable storage device).

Preferably, the portable storage device also includes an encryption unit for streaming the digital content to the receiving device as encrypted streaming content.

Preferably, the license is for only one receiving device as identified by the identification parameter. Alternatively, the license is for a plurality of authorized receiving devices.

Preferably, the mechanism for receiving the value of the identification parameter from the receiving device is further operative to transfer the digital content to the receiving device. More preferably, this mechanism includes a connector for transferring the digital content to the receiving device.

Preferably, the mechanism is operative to receive the value of said identification parameter via a wired communication link, such as a USB connector. Alternatively, the mechanism is operative to receive the value of tee identification parameter via a wireless communication link, such as an RFID reader.

Preferably, the receiving device is a viewing device. More preferably, the viewing device is a digital television.

Preferably, the licensing policy includes a value of at least one parameter that determines an amount of the digital content that is streamed to the receiving device. Optionally, the licensing policy includes a value of at least one parameter that determines a quality of the digital content that is streamed to the receiving device. More preferably, this parameter controls at least one aspect, of the streamed content, such as color, continuity, display, superimposition of a pre-defined image, frame size, streaming rate, etc.

Preferably, the controller is further operative, upon the controlled feeding of the digital content to the receiving device, to update the license stored in the non-volatile memory according to the licensing policy.

Optionally, the controller is further operative to provide the controlled feeding of the digital content to the receiving device in accordance with the licensing policy in an absence of the identification parameter or in an absence of the license.

In accordance with another embodiment of the present invention, there is further provided a digital rights management system that includes: (a) a receiving device that is operative to display digital content; and (b) a storage device that includes: (i) a mechanism for receiving a value of an identification parameter from the receiving device; and (ii) a non-volatile memory for storing digital content, a licensing policy, and a license for viewing the digital content on the receiving device as identified by the identification parameter; wherein the storage device is operative, in response to the identification parameter and contingent on a presence of the license, to provide a controlled feeding of at least a portion of the digital content to the receiving device, in accordance with the licensing policy.

Preferably, the method also includes a network device for issuing the license. The network device is typically physically separated from the storage device and the receiving device.

In accordance with another embodiment of the present invention, there is further provided a portable storage device for purchasing digital rights for digital content, the portable storage device includes: (a) a mechanism for receiving a respective identification parameter from at least one receiving device; (b) a non-volatile memory for storing the digital content and a licensing policy; and (c) a controller that is operative according to the licensing policy: (i) to obtain a corresponding license from a network device, which is physically separated from the portable storage device and the receiving device, for viewing the digital content on the receiving device as identified by the respective value of the identification parameter, and (ii) contingent on a presence of a corresponding license, to provide a controlled feeding of at least a portion of the digital content to the receiving device.

In accordance with another embodiment of the present invention, there is further provided a digital rights management method that includes the steps of: (a) storing digital content and a licensing policy; (b) receiving a value of an identification parameter from a receiving device; (e) verifying, presence of a license, in the non-volatile memory, for viewing the digital content on the receiving device as identified by the identification parameter; and (d) contingent on the presence of the license and according to the licensing policy, transferring at least a portion of the digital content to the receiving device.

Preferably, the digital content is transferred to the receiving device as plain streaming content.

Preferably, the digital content is transferred to the receiving device as encrypted streaming content.

Preferably, the method also includes the step of communicating with a network device for obtaining the license in response to receiving the value of the identification parameter.

Preferably, the method also includes the step of updating the license in accordance with the licensing policy.

Preferably, the license is for only one receiving device as identified by the identification parameter. Alternatively, the license is for a plurality of authorized receiving devices.

Preferably, the identification parameter is received via a wired communication link, such as a USB connector. Alternatively, the identification parameter is received via a wireless communication link, such as a RFID reader.

Preferably, the receiving device is a viewing device. More preferably, the viewing a device is a digital television.

Preferably, the licensing policy includes a value of at least one parameter that determines an amount of the digital content that is streamed to the receiving device. Optionally, the licensing policy includes a value of at least one parameter that determines a quality of the digital content that is streamed to the receiving device. More preferably, this parameter controls at least one aspect, of the streamed content, such as color, continuity, display, superimposition of a pre-defined image, frame size, streaming rate, etc.

Preferably, the method also includes the step of transferring an attenuated portion of the digital content to the receiving device in accordance with the licensing policy in an absence of the license or in an absence of the identification parameter.

In accordance with another embodiment of the present invention, there is further provided a method of purchasing digital rights for digital content that includes the steps of: (a) selling a user a portable storage device that is operative to connect to at least one receiving device and receive a respective value of an identification parameter from the receiving device, wherein the portable storage device includes a controller and a non-volatile memory for storing the digital content and a licensing policy; (b) contingent on a presence of a corresponding license, offering the user to purchase, in accordance with the licensing policy, the corresponding license from a network device, that is physically separated from the portable storage device and the receiving devices, for viewing the digital content oil the receiving device upon reconnecting the portable storage device to the receiving devices as identified by the respective value of the identification parameter.

In accordance with another embodiment of the present invention, there is further provided a pay-per-view method of doing business that includes the steps of: (a) detecting a portable storage device that is configured to provide a controlled feeding of digital content to a viewing device contingent on a presence of a license; (b) in response to detecting this portable storage device, offering a user to download the digital content and a corresponding licensing policy to a non-volatile memory of the portable storage device; and (c) selling the user the license for viewing the digital content on the viewing, device as identified by a value of an identification parameter received for the viewing device, wherein the digital content is streamed to the viewing device according to the corresponding licensing policy and the license and in response to the identification parameter.

Preferably, the user is offered to download the digital content and the corresponding licensing policy flee-of-charge.

Preferably, the license is purchased by the user from a network device.

Additional features and advantages of the invention will become apparent from the following drawings and description.

BRIEF DESCRIPTION OF THE DRAWINGS

For a better understanding of the invention with regard to the embodiment thereof, reference is made to the accompanying drawings, in which like numerals designate corresponding sections or elements throughout, and in which:

FIG. 5 is a cross-section through the connector of FIG. 4 when plugged into a digital USB socket, as described in Appendix A;

FIG. 6 is a cross-section through the connector of FIG. 4 when plugged into a TV set, as described in Appendix A;

DETAILED DESCRIPTION OF THE PREFERRED EMBODIMENTS

Figure 1:
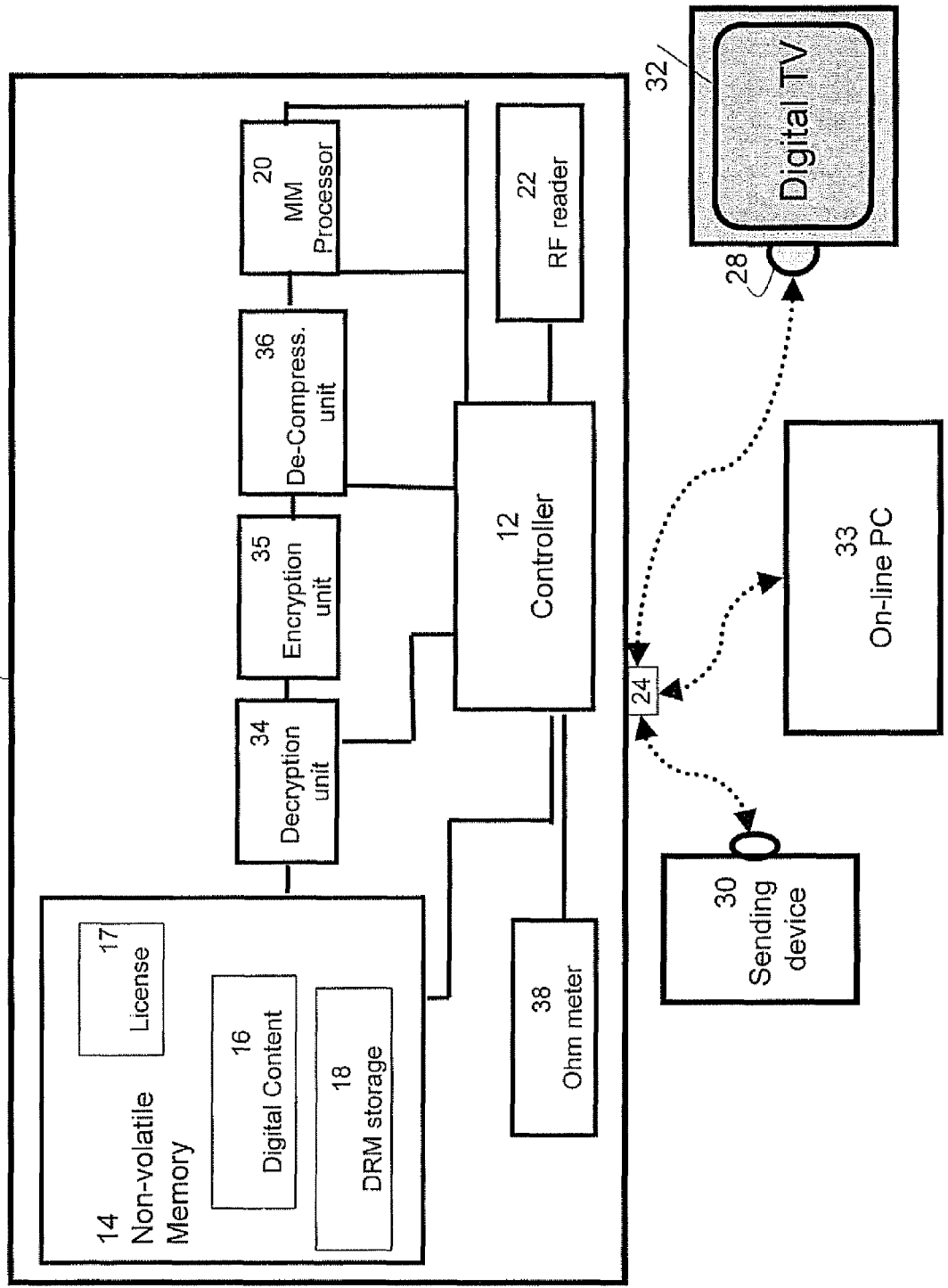
FIG. 1 is a block diagram of a system of the present invention including a portable storage device that is alternately connected to a host sending device, a viewing device, such as a digital TV, and an on-line PC.

The present invention is a portable storage device and method providing copyright protection of digital content (e.g. video content, files, music, etc.) by controllably streaming the digital content from the portable storage device to a receiving device.

Typically, the receiving device is a viewing device (such as a digital TV).

In accordance with the present invention, the streaming of content from the portable storage device is contingent on the availability of a license that is obtained for displaying the digital content on a particular viewing device. A license is defined herein as a trusted data object relating to a specific receiving device and to specific digital content.

Note that in one preferred embodiment of the present invention the license is obtained for a particular receiving device only. Alternatively, the license is obtained for any receiving device listed among a group of authorized receiving devices. The group of authorized receiving devices can be defined, for example, by connecting the portable storage device to each receiving device separately, receiving respective identification parameters that uniquely characterize the receiving devices, and then listing all these receiving devices as identified by their respective identification parameters as authorized receiving devices.

The purchasing of a license can be achieved, for example, by the portable storage device, upon receiving an identification parameter, such as a serial number, from the designated digital TV (see discussion of FIG. 2 below for one way to receive an identification parameter) and establishing secure communication between the portable storage device (including the viewing device identification parameter) and a network server of the publisher (or a retailer) having digital rights to the digital content.

The purchasing of the license can be further achieved by configuring the viewing device with enhanced logic that enables the viewing device to directly connect with the network server of the publisher and obtain the license.

The manner in which a user can purchase the license for viewing the digital content on the viewing device is effected according to a license policy that is stored in a non-volatile memory of the portable storage device.

A licensing policy is defined herein as any information related to the digital rights usage of the digital content that affects the manner in which the digital content is to be transmitted to the receiving device and displayed on the receiving device. The licensing policy can include values of parameters for controlling the amount of digital content, the quality of digital content, etc.

A typical example is implementing the licensing policy to limit the display of data content to a small number of viewing sessions (e.g. 3 times only), or limiting the display of the digital content to a short time period (e.g. until the end of next week only), etc.

In another embodiment of the present invention, the licensing policy is implemented to provide a variety of license types. For example, the licensing policy can be implemented to include a plurality of license types (i.e. a first license limiting the display of the digital content to 1 day, a second license limiting the display of the digital content to 10 days, etc.), each purchased by the user for a different price. The user then purchases the license he desires. This can be implemented, for example, by displaying the variety of license types, as are set by the licensing policy, on the viewing device itself when initially connecting the portable storage device to the viewing device (to receive the identification parameter) or by displaying the license types on the network device upon purchasing the license from the network device.

In another embodiment of the present invention, the licensing policy is implemented to attenuate the quality and/or the quantity of the streaming of the content to the viewing device in case a valid license has not been obtained for this viewing device from the publisher. This can be applied, for example, by implementing the licensing policy to instruct the portable storage device to transfer all the stored digital content in maximum quality, in case the portable storage device is connected to a licensed digital television (e.g. having purchased full digital rights from the publisher) and to attenuate the amount of digital content (for example by transferring only 5 minutes of streaming content), in case the portable storage device is connected to an unlicensed digital television (e.g. not having purchased any digital rights from the publisher).

Such implementation has the advantage of suggesting to the user viewing the screen of the digital TV what he is losing by not obtaining a license, and is common in the art of electronic commerce.

The attenuation of the quality of the digital content can be done, for example, by reducing the displayed colors, by interrupting the continuity of the displayed content, by superimposing a caption upon the displayed content, by reducing the frame size of the displayed content, by reducing the streaming rate and blurring the image, etc. When the streaming rate is reduced, the bandwidth of the signal transferring the streaming content is reduced causing the image to be displayed somewhat blurred on the screen of the digital TV.

Optionally, in case the portable storage device of the present invention is plugged into an ordinary viewing device that is not configured to identify itself to the portable storage device as required, the digital content is transferred as attenuated streaming content to be viewed on the viewing device according to the policy of no-license.

Referring to FIG. 1, there is shown a block diagram of a system of the present invention including a portable storage device 10 that is alternately connected to a host sending device 30, a viewing device, such as a digital TV 32, and an on-line PC 33. The dotted lines refer herein to mean that host sending device 30, digital TV 32, and on-line PC 33 are connected alternately to portable storage device 10, not simultaneously.

A Controller 12, such as USB 2.0 high speed device controller, available from systems Ltd., Kefar Sava, Israel, is operative to provide a controlled feeding of streaming content to a receiving device, such as a digital TV 32, in response to a license and a respective identification parameter for the digital TV. The license may be received for the digital TV 32 from any network device (e.g. on-line PC 33) and then stored in a non-volatile memory 14. The manner (e.g. the quality, the amount of content, etc.) of which the digital content is streamed, via controller 12, to the digital TV 32 is contingent on the licensing policy stored in a DRM storage 18 of non-volatile memory 14.

A non-volatile memory 14, such as a flash memory, stores the license in a license storage area 17. Non-volatile memory 14 further includes the digital content (stored in Digital Content storage 16) and the licensing policy (stored in DRM storage 18) that are typically received from a sending device 30 via USB connector 24. Typically, in accordance the common procedures of the DRM technology, the digital data is received (and thus also stored in Digital Content unit 16) in a compressed and encrypted manner.

A Decryption unit 34, equipped with a private decryption key of the portable storage device 10 (that corresponds to a public key that is sent from the portable storage device 10 when connecting the portable storage device 10 to the sending device 30), is provided to decrypt the encrypted digital content (and the licensing policy, if required) that is stored in Digital Content unit 16.

In a preferred method of the present invention, the decrypted digital content is further encrypted, by an Encryption unit 35, with a private key of the digital TV 32 that corresponds to a public key that is received from the digital TV 32 (typically in addition to receiving the identification parameter). The digital TV 32, upon receiving the encrypted streaming content, decrypts this content with its private key. This key-exchange procedure ensures that the digital content is viewed on the specific viewing device as identified by the identification parameter only.

Note that providing Encryption unit 35 is optional and the digital content does not necessarily have to be encrypted by the portable storage device. Instead, the digital content is transferred to the viewing device as plain streaming content to be viewed on a viewing device that is equipped with standard logic (i.e. does not require computing logic and decrypting capabilities in additional to the standard), while providing copyright protection of the digital content. By plain streaming content we refer in the present invention either to streaming content that has never been encrypted or to encrypted digital content that has already been decrypted by the portable storage device. In order to ensure that the digital content is streamed to the designated viewing device only, it is possible to constantly sample the identification parameter received from this viewing device and condition the streaming of the remaining portions of the content on the validity of such identification parameter. Such implementation spares the need of configuring a special viewing device that is further capable of decrypting the streaming content received from the portable storage device.

A De-Compression unit 36 is provided to apply de-compression techniques, as known in the art, for de-compressing the digital content before the digital content is streamed to the viewing device.

A Multi-Media Processor 20 is provided to convert the de-compressed digital content received from De-Compression unit 36 to streaming content.

In a preferred embodiment, portable storage device 10 of the present invention alternately communicates with matching connectors on either one of the sending device 30, the digital TV 32 and the on-line PC 33 using a common connector 24. Connector, 24 is typically implemented with two separate channels that are mechanically desired to fit a both a standard USB socket (for USB protocol communications) and a modified USB socket (for video communication), as described in Appendix A.

TV connecting device 28, connected to Digital TV 32 (see FIG. 2), is provided to modify a standard TV to function as a host and transfer data to the portable storage device.

Configuring the TV connecting device 28 to be further applicable to provide the portable storage device with the identification parameter can be achieved, for example, by configuring the TV connecting device 28 with enhanced logic to include a set of resistors (see FIG. 2), each of a very high (i.e. mega ohms) and different resistance. A resistance measurement unit 38 is optionally provided for measuring the resistance between pairs of adjacent pins within the TV connecting device 28 when connector 24 is plugged into the TV connecting device. The values, uniquely obtained from measurements applied on all pairs of adjacent pins within the TV connecting device 28, provide controller 12 of portable storage device 10 the identification parameter required for the digital TV 32.

An optional way to receive the identification signal from the digital TV 32 is by transferring RF signals from the receiving device. An RFID reader 22, such as the REID reader module, available from Parallax, Inc., Rocklin, Calif., can be optionally implemented within the portable storage device to receive these RE signals.

In an alternative embodiment, the communication between portable storage device 10 and matching connectors on either—the sending device 30, the receiving device 32, or the network device 33, is effected using respective connecting devices of portable storage device 10 instead of a single common connector 24.

Figure 2:
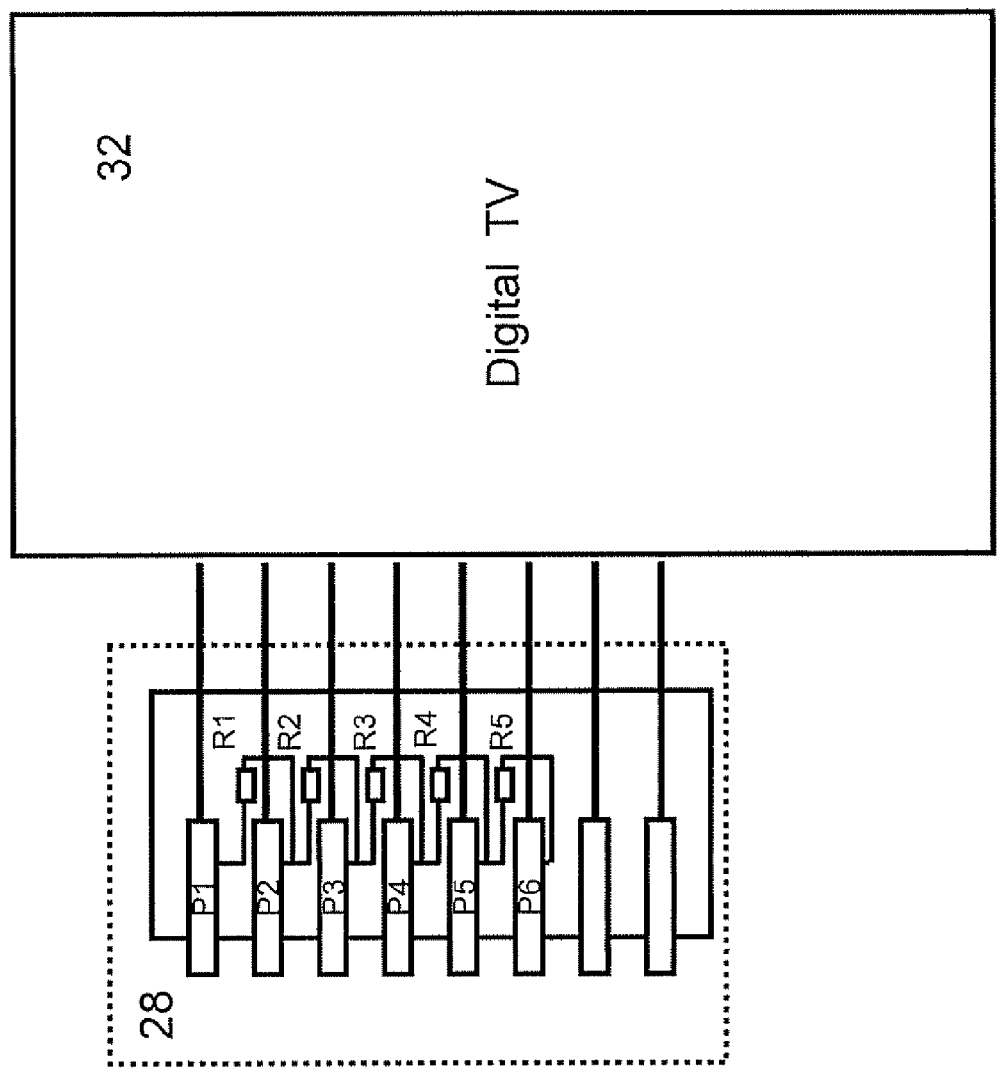
FIG. 2 is a schematic illustration of a connecting device implemented with enhanced logic to include a set of resistors.

Referring to FIG. 2, there is shown a schematic illustration of a TV connecting device 28 implemented with enhanced logic to include a set of resistors. TV connecting device 28 of Digital TV 32 is configured with a set of resistors R1, R2, R3, R4 and R5 that are connected between pairs of adjacent pins P1, P2, P3, P4, P5, and P6 of TV connecting device 28, respectively. Each resistor is implemented with a very high (i.e. mega ohms) and different resistance to enforce a different resistance measurement on resistance measurement unit 38 when connecting USB connector 24 to TV connecting device 28.

Figure 3:
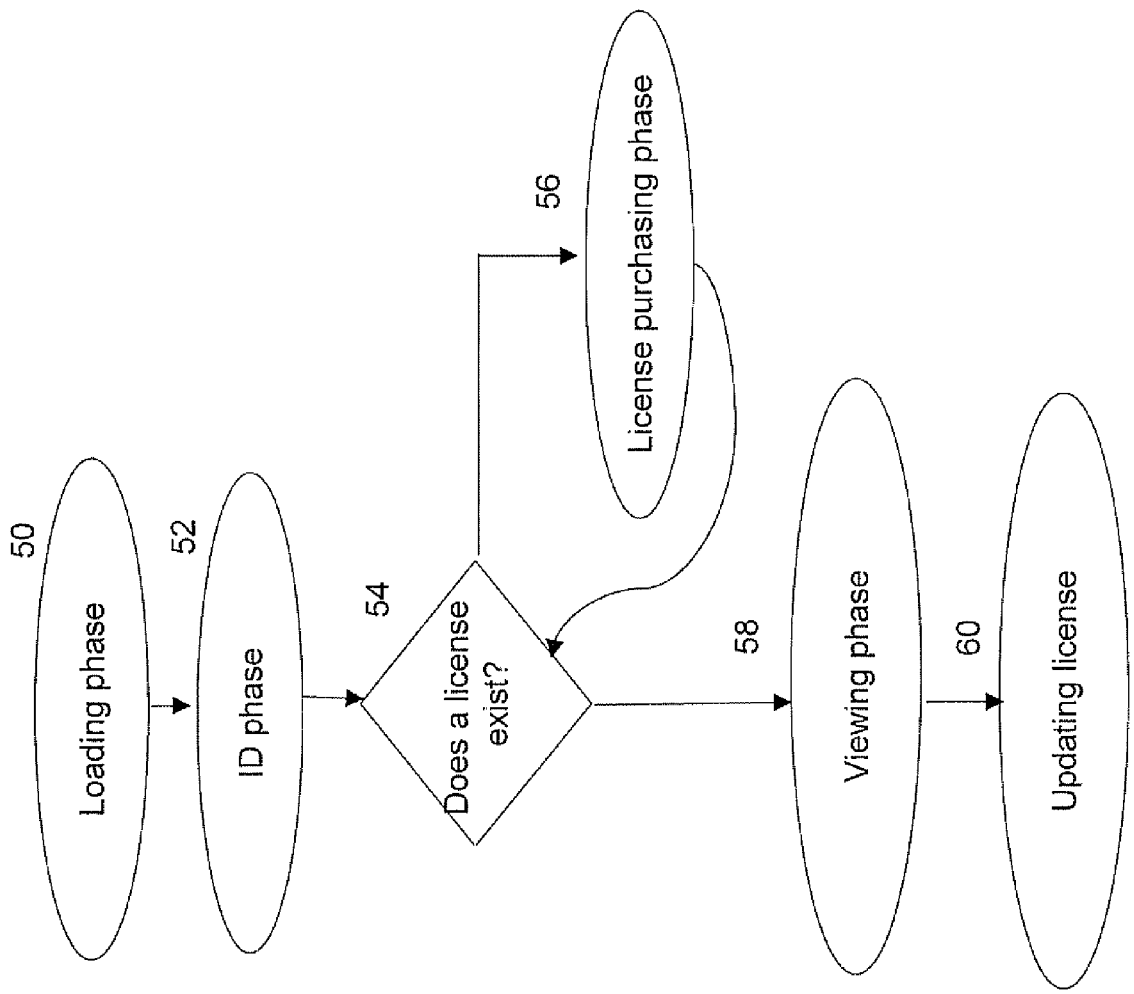
FIG. 3 is a flow chart of a method of the present invention.

Referring to FIG. 3, there is shown a flow chart of a method of the present invention. Note that the method of FIG. 3 describes the display of digital content on a single viewing device as an example only, as the method of the present invention can further includes displaying, upon request, the digital content on a plurality of viewing device listed among a croup of authorized viewing devices, as described above.

The initial step is the loading phase 50, wherein a user connects the portable storage device to a sending device (such as an automatic video vendor) of a publisher. Upon connection, a public key is transferred from the portable storage device to the sending device as an identifier of the portable storage device. Digital content selected by the user to be downloaded to the portable storage device is then transferred as encrypted content (encrypted by the sending device with the public key) to be stored (as encrypted content) within the portable storage device. At this phase a licensing policy corresponding to the selected digital content is also transferred from the sending device to the portable storage device.

At the next step, ices ID phase 52, the portable storage device is plugged to a viewing device, such as a digital TV 32. An identification parameter (e.g. serial number), uniquely characterizing the viewing device of which the portable storage device is plugged to, and a public key associated with a private key stored in the viewing device are both transferred from the viewing device to the portable storage device.

At the next step 54 it is verified whether a valid license is stored in the non-volatile memory of the portable storage device to allow viewing the digital content on this viewing device as identified by the identification parameter.

In the affirmative case, the method of the present invention proceeds directly to step 58 (thus skipping step 56).

However in the negative case, the license purchasing phase 56, the user unplugs the portable storage device from the viewing device and plugs the portable storage device into a network device, such as an on-line PC or a telephone, and initiates a licensing request from a licensing authority (such as the publisher or a retailer) to purchase a license and allow displaying the digital content on this specific viewing device as identified by the identification parameter. The license purchased by the user (in form of a rights object) is sent to be stored in the portable storage device and the method returns to apply step 54. Typically, the license purchased by the user is chosen among a variety of license types that are displayed on the network device in accordance with the license policy stored in the portable storage device.

At step 58, the viewing phase, the portable storage device is connected to the viewing device and then the digital content is sent to the viewing device as streaming content to be displayed on the viewing device. Optionally, before then digital content is sent, the digital content is once decrypted with the private key of the portable storage device and then encrypted with the public key previously sent from the viewing device.

At the last step 60, after the digital content is displayed oil on the viewing device, the license obtained for displaying the digital content on this viewing device is updated, if necessary, in association with this viewing device. The updating of the license is effected according to the type of license purchase by the user at step 56. For example, in case the license purchased by the user is limited to enable to a small number of viewing sessions (e.g. 3 times only) of the digital content, then after the streaming content is transferred to be displayed on the viewing device the license is updated to allow one fewer viewing sessions (e.g. 2 times only).

Optionally, in case the portable storage device of the present invention is plugged into an ordinary viewing device that is not configured to identify itself to the portable storage device as required or in case a license is not obtained for displaying the digital content on the designated viewing device, the digital content is transferred as attenuated streaming content to be viewed on the viewing device according to the policy of no-license.

In accordance with another embodiment of the present invention, there is provided a method of purchasing digital rights in form of a valid license for displaying digital content on one or more authorized viewing devices. The method includes selling a user the portable storage device of the present invention that is operative to connect to one or more viewing devices and receive respective values of identification parameters. Contingent on a presence of a corresponding license, the user is then offered to purchase the corresponding license from a network device, according to the licensing policy, for viewing the digital content on the viewing device upon re-connecting the portable storage device to the viewing devices as identified by the respective value of the identification parameter.

It should be further noted that in accordance with another method of the present invention, there is further provided a pay-per-view method of doing business that allows a user to download as much digital content (erg, videos, etc.) to his/her portable storage device as desired free of charge by charging the user only when he/she purchases a valid license for viewing this digital content on a viewing device. In other words, the pay-per-view method includes offering a user to download the digital content and a corresponding policy to a portable storage device of the present invention free of charge, and charging the user only when the user purchases the license for viewing the digital content on this viewing device.

Having described the system of the present invention with regard to certain specific embodiments thereof, it is to be understood that the description is not meant as a limitation, since further modifications will now suggest themselves to those skilled in the art, and it is intended to cover such modifications as fall within the scope of the appended claims.

Appendix A—Modified from U.S. provisional application No. 60/747,194. References in this Appendix to an "invention" are to the invention of provisional application No. 60/747,194.

TERMS

Bow (of a personal data storage device)—The front end of the
   device that can easily be plugged into
a lost, and is the natural location on the device for installing a
   connector.
PSD—A portable storage device.
UFD—A USB Flash Drive

BACKGROUND OF THE INVENTION

Digital multimedia players are well known in the art of electronics engineering as devices that convert digital data into streaming video or audio to be played on a TV set or in a stereo system.

Portable storage devices (PSDs) that are equipped with a programmable controller are able to input a digital file containing a multimedia item, convert the file into streaming media, and output the media stream into a playing device. Whereas large storage devices, such as a personal computer or a TV set-top box, have a connector for inputting digital data and another connector for sending media streams to an output device and therefore can handle such tasks, small PSDs typically cannot accommodate two connectors due to their small size.

It would be very desirable to invent a system that allows a small PSD to have a single connector at its bow that will be used both for inputting digital files and for outputting streaming media. It will be even more desirable to invent such as system that will automatically recognize which of the two functions is being used, and will adjust the protocol of the communication with the port accordingly.

SUMMARY OF THE INVENTION

The present invention teaches, for the first time, a system for connecting a PSD to a source of a multimedia file such as a computer, via a digital protocol such as USB, and to a destination of streaming media, such as a digital TV set, via a streaming media protocol, using a single connector.

There are several aspects to this invention.

In one aspect of the invention, the PSD should have the functionality of a large non-volatile storage area that can store a large digital file, as well as a USB interface that can connect the PSD, as a disk drive, to a digital computer. In this aspect, the PSD has to behave as a large UFD.

In another aspect of the invention, the PSD should have the functionality of a digital media player, converting a digital file into streaming media. This conversion should comply with one or more of the standards of multimedia content storage, such as MPEG 3, MPEG 4, or other such standards as appear in the art. The PSD should also be able to feed the streaming media into an output device, such as a digital TV or a digital stereo system, using a standard protocol and a standard connector, such as 32' Diagonal Cinema Series® HD LCD Television, available from Toshiba®.

In a third aspect of the present invention, the two connectors mentioned above should be implemented in one physical connector that will fit both the standard digital socket for input and the standard streaming socket for output.

In a forth aspect of the present invention, the system should be able to automatically detect the type of connector into which it is plugged and resolve between two on more possible socket types.

In a fifth aspect of the present invention, the system should be able to automatically switch signals to the pins that should be active in a given protocol, and isolate pins that are not relevant for the current protocol but come in electric contact with pins that are active device.

The way in which the above-mentioned five aspects of the present invention are embodied is better understand from the following detailed description of the drawings.

DETAILED DESCRIPTION OF THE DRAWINGS

Figure 4:
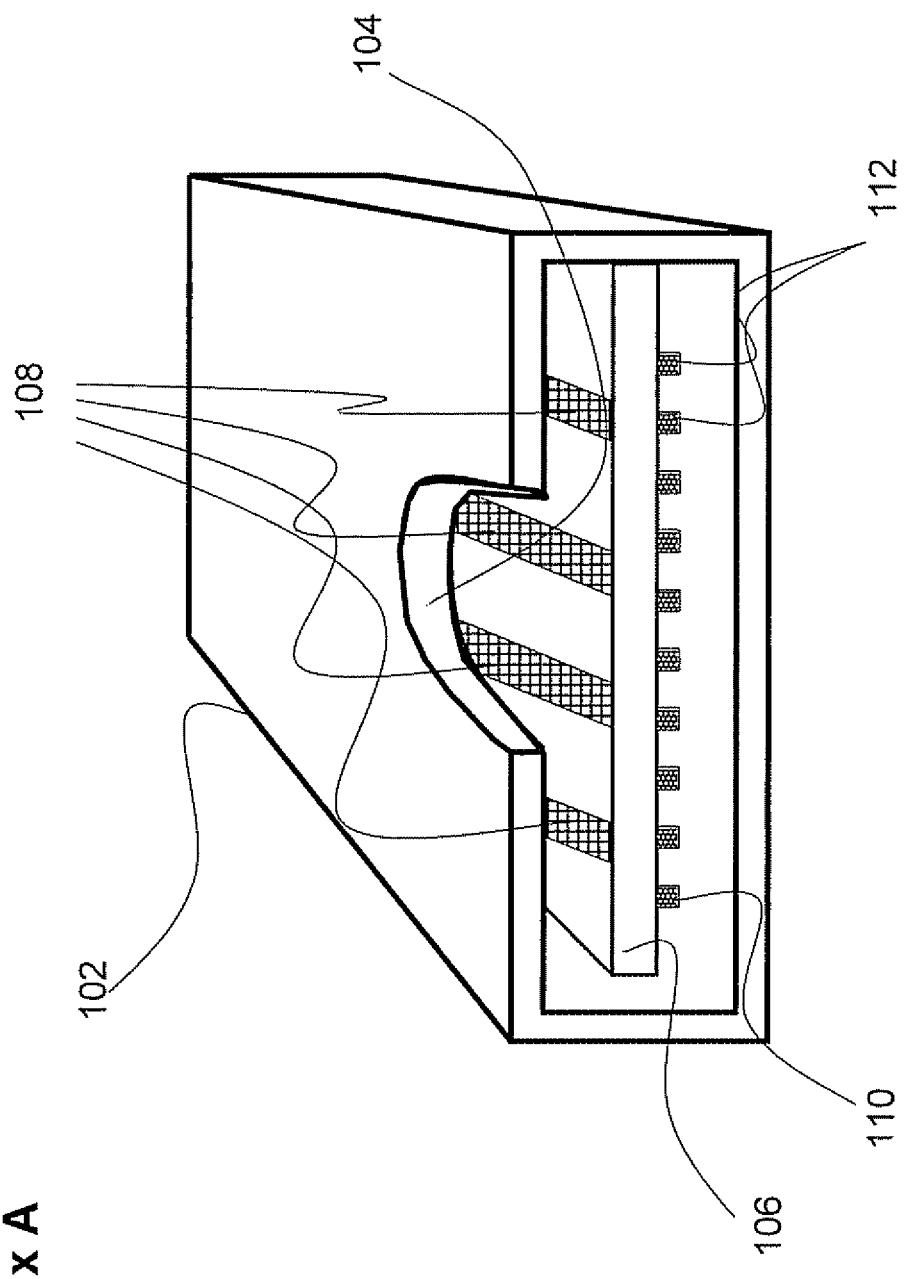
FIG. 4 is a schematic drawing of a dual mode connector, as described in Appendix A.

Referring to FIG. 4, there is shown a schematic drawing of a preferred embodiment of a dual mode multimedia connector. The connector is built to comply with the USB standard. Accordingly, it includes a USB socket compatible shell 102 and inner four contacts pins 108.

In addition, this unique connector includes an optional recession 104, and additional contact pins. For example, in this embodiment it includes ten additional pins 110. In regular USB operation, the connector is inserted into a standard USB socket, hence only the four standard pins 108 are operational. When plugged into a special multimedia socket, the host (into which the connector is plugged), may automatically identify that such a special dual connector is plugged in, and initiate a different multimedia protocol to be transferred via the additional pins 110 as well as through the original pins 108. Such automatic identification may be performed in several ways. In this embodiment it may be done mechanically by providing a micro switch (not shown) in the recession 104 of the dongle and sensing if the socket has a protrusion that enters the recession. If there is a protrusion, then the dongle sets up the connector to the "streaming media" configuration explained in FIG. 8 below. If there is no protrusion, then the dongle sets up the connector to the "standard USB" configuration shown in FIG. 7. The identification of the connector mode can also be sensed by electrical means—sensing the connectivity of a specific pin 112 that can be grounded in the TV Set socket, and not in the USB socket. FIG. 1 shows an identification that is carried by two pins 112, but other numbers of pins may be designed for identification as well.

It should also be noted that although two special pins are designated for identification in FIG. 4; the same pins may also be acting for electrical means other than identification.

Referring to FIG. 5 and FIG. 6, there is shown a cross-section through the connector of FIG. 4, in a plane that is vertical to the direction of the pins, and crosses the pins, showing both the pins of the plug and the pins of the socket.

Referring to FIG. 5, there is shown the cross-section when the plug is plugged into a standard digital USB socket. The connection of the connector into the socket is done by inserting one shell of the plug 120 into the mating shell of the socket 121. The digital USB socket contains 4 four USB pins 128 attached to an insulating plate 130 according to the USB standard. These standard USB pins 128 are connected to the four pins of the plug 108, which are also attached to an insulating plate 106. In this connection, the special pins 110, 112 used for identification of the socket remain unconnected, hence the connector acts as a regular digital USB connector.

Referring to FIG. 6, there is shown a same connector when plugged into a TV set, having a special socket that is designed to mate with the plug of the present invention.

Again, the connection is done by inserting the shell of the plug 132 shell into the shell of the socket 133. In this connection, the mating socket includes two insulating plates 134. On the upper plate there are four pins 136 that are in contact with the pin 108 of the connector. In addition, the socket has ten pins 138, 140, that are connected to the special pins of the connector 110, 112. The identification pins of the connector 112 are in contact with the identification pins of the socket 140, and the dongle, sensing this, sets the connector to the configuration of the TV set mode.

Figure 7:
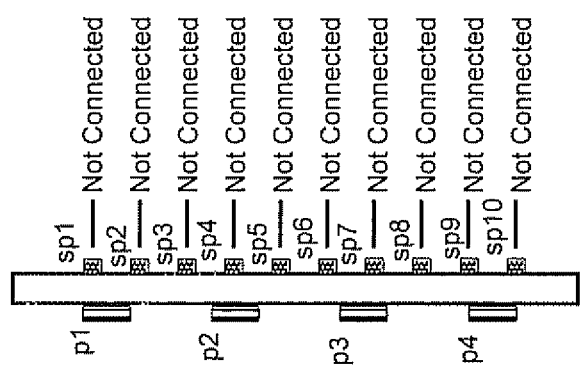
FIG. 7 is a pinout layout of the connector of FIG. 4 when set to act as a PSD, as described in Appendix A.

Referring to FIG. 7, there is shown a schematic pinout layout of the connector when connected and acting as a PSD.

One can see that the four USB pins p1, p2, p3, and p4 are acting in according to a regular standard digital USB protocol, while all other sp1 special pins sp1, sp2, sp3, sp4, sp5, sp6, sp7, sp8, sp9, and sp10 are not connected.

Figure 8:
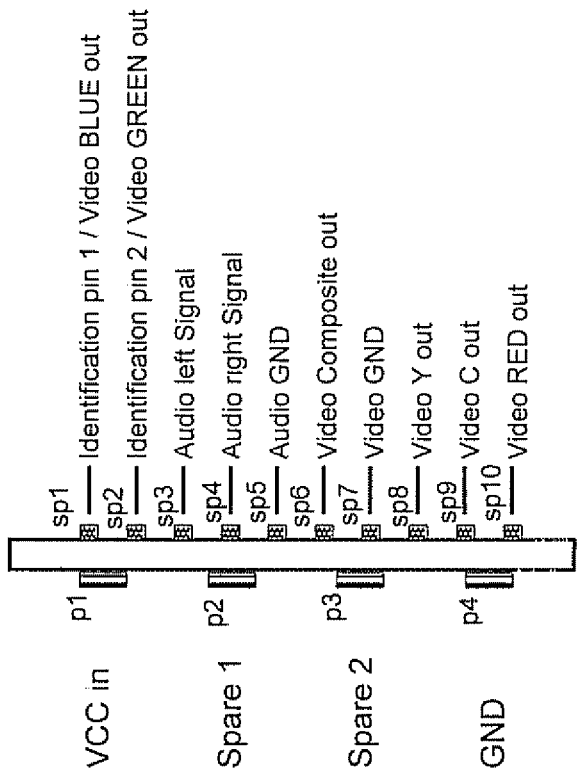
FIG. 8 is a pinout layout of the connector of FIG. 4 when set to act as a video player, as described in Appendix A.

Referring to FIG. 8, there is shown a pinout layout of the same connector, however here the pinout suits the configuration when plugged into a TV set. A power signal VCC and general ground signal GND are connected via the four standard USB pins p1, p2, p3, and p4. All other video signals are connected using the additional 00 special pins sp1, sp2, sp3, sp4, sp5, sp6, sp7, sp8, sp9, and sp10.

The invention claimed is:

1. A portable storage device for providing a controlled streaming of streaming digital content, the portable storage device comprising:
    a non-volatile memory comprising a device license and a license policy, the license policy comprising a quality parameter; and
    a controller configured to receive encrypted content from a sending device;
    wherein the controller is further configured to receive a device identifier from a receiving device over a physical connection
    wherein the controller is further configured to compare the device identifier to the device license;
    wherein the controller is further configured to decrypt the encrypted content;
    wherein the controller is further configured to modify the quality of the decrypted content using the quality parameter; and
    wherein the controller is further configured to stream the modified decrypted content to the receiving device.

2. The storage device of claim 1, wherein the device license is for only one receiving device, wherein the one receiving device is the receiving device identified by the device identifier.

3. The storage device of claim 1, wherein the device license is for a plurality of authorized receiving devices.

4. The storage device of claim 1, wherein the physical connection includes a USB connector.

5. The storage device of claim 1, wherein the receiving device is a viewing device.

6. The storage device of claim 5, wherein the viewing device is a digital television.

7. The storage device of claim 1, wherein an amount parameter of the licensing policy determines an amount of the modified decrypted content that is streamed to the receiving device.

8. The storage device of claim 1, wherein the quality parameter of the licensing policy determines a quality aspect of the modified decrypted content that is streamed to the receiving device.

9. The storage device of claim 8, wherein the quality parameter of the licensing policy controls at least one aspect, of the modified decrypted content, the at least one aspect comprising color, continuity, display, superimposition of a pre-defined image, frame size, or streaming rate.

10. The storage device of claim 1, wherein the controller is further configured to update, upon a streaming of the modified decrypted content to the receiving device, the device license according to the licensing policy.

11. The storage device of claim 1, wherein the controller is further configured to repeatedly sample an identification parameter during a streaming of the modified decrypted content to the receiving device and to condition a streaming of the unmodified decrypted content on a comparison of the device identifier to the device license.

12. A storage device for purchasing digital rights for digital content, the storage device comprising:
    a non-volatile memory comprising a device license and a license policy comprising a quality parameter; and
    a controller configured to:
      receive encrypted content from a sending device;
      receive a device identifier from a receiving device over a physical connection;
      authorize the receiving device based on a comparison of the device identifier to the device license;
      decrypt the encrypted content;
      modify the decrypted content according to the quality parameter; and
      stream the modified decrypted content to the receiving device.

13. The storage device of claim 12, wherein the controller is further configured to condition a streaming of unmodified decrypted content to the receiving device on authorization of the receiving device based on the device identifier.

14. A digital rights management method comprising:
    storing in a portable memory a device license and a license policy comprising a quality parameter;
    receiving, by the portable memory, encrypted content from a sending device;
    receiving, by the portable memory, a device identifier from a receiving device over a physical connection;
    comparing, by the portable memory, the device identifier to the device license;
    decrypting, by the portable memory, the encrypted content;
    modifying, by the portable memory, the quality of the decrypted content using the quality parameter; and
    streaming, by the portable memory, the modified decrypted content to the receiving device.

15. The digital rights management method of claim 14 further comprising, in response to receipt of the device identifier, obtaining the device license by communicating with a network device.

16. The digital rights management method of claim 14 further comprising updating the device license in accordance with the licensing policy.

17. The digital rights management method of claim 14, wherein the device license is for only one receiving device, the only one receiving device comprising the receiving device identified by the device identifier.

18. The digital rights management method of claim 14, wherein the device license is for a plurality of authorized receiving devices.

19. The digital rights management method of claim 14 wherein the physical connection is a wired communication link.

20. The digital rights management method of claim 19, wherein the wired communication link includes a USB connector.

21. The digital rights management method of claim 14, wherein the receiving device is a viewing device.

22. The digital rights management method of claim 21, wherein the viewing device is a digital television.

23. The digital rights management method of claim 14, wherein an amount parameter of the licensing policy determines an amount of the modified decrypted content that is streamed to the receiving device.

24. The digital rights management method of claim 14, wherein the quality parameter determines a quality of the modified decrypted that is streamed to the receiving device.

25. The digital rights management method of claim 24, wherein the quality parameter controls at least one of: color, continuity, display, superimposition of a pre-defined image, frame size, and streaming rate.

26. The digital rights management method of claim 14, further comprising repeatedly sampling an identification parameter with a controller of the portable memory during the streaming of the modified decrypted content to the receiving device, the sampling in response to receipt of a value of the identification parameter from the receiving device and verification of the device license for the receiving device identified by the value of the identification parameter, wherein the value of the identification parameter is the device identifier, and wherein continued streaming of the modified decrypted content to the receiving device is conditioned on a validity of the identification parameter sampled during the streaming.

* * * * *